United States Patent [19]

Fouss et al.

[11] 4,359,167
[45] Nov. 16, 1982

[54] SUBTERRANEAN PLASTIC TANK

[75] Inventors: James L. Fouss; John J. Parker, both of Findlay; Donald A. Lytle, Tiffin, all of Ohio

[73] Assignee: Hancor, Inc., Findlay, Ohio

[21] Appl. No.: 209,746

[22] Filed: Nov. 24, 1980

Related U.S. Application Data

[63] Continuation-in-part of Ser. No. 12,019, Feb. 14, 1979, Pat. No. 4,254,885.

[51] Int. Cl.$^3$ .............................................. B65D 6/38
[52] U.S. Cl. ..................................... 220/72; 220/5 A; 220/83
[58] Field of Search .................. 220/72, 83, 5 A, 5 R, 220/1 B; D25/36; D23/2

[56] References Cited

U.S. PATENT DOCUMENTS

| | | | |
|---|---|---|---|
| D. 207,293 | 3/1967 | Ferm | D23/2 |
| D. 233,887 | 12/1974 | Bower | D23/2 |
| D. 234,298 | 2/1975 | Bower | D23/2 |
| D. 234,461 | 3/1975 | Piotrowski | D23/2 |
| D. 239,506 | 4/1976 | Myers | D23/2 X |
| 3,662,918 | 5/1972 | Crawford et al. | 220/5 A X |
| 4,231,482 | 11/1980 | Bogan | 220/5 A |
| 4,254,885 | 3/1981 | Fouss et al. | 220/72 |

OTHER PUBLICATIONS

Wedco, La Fosse, Septique on Polyethylene.
Wedco, Septic Tank 1-750.0.
Fiber Erectors, The Modern, Lightweight Sewage System.
Soltralco, Ensembles d'Assainissement Eparation.

Primary Examiner—Steven M. Pollard
Attorney, Agent, or Firm—Fay & Sharpe

[57] ABSTRACT

A corrugated, thin walled plastic tank is ideally suited for subterranean storage and transmission of sewage and other materials. The tank has a bottom wall which terminates in a peripheral edge disposed in a horizontal plane. A corrugated, peripheral wall extends upward from the peripheral edge to an apex area. The corrguations of the peripheral wall include alternating crown and root portions. A peripheral rib extending circumferentially around the peripheral wall is defined by a plurality of rib portions which are disposed in the root portions of the corrugations. Each rib portion has a rib outer portion which is substantially flush with the adjoining crown portions and rib side portions which extend from the rib outer portion into the adjacent root portion. An indentation area is formed by enlarging one of the root portions. An annular sleeve depends from the indentation area into the interior of the tank to provide a fluid access with the interior of the tank. An annular rim is disposed in the apex area surrounding another opening for providing access to the interior of the tank.

25 Claims, 12 Drawing Figures

SUBTERRANEAN PLASTIC TANK

BACKGROUND OF THE INVENTION

This application is a continuation-in-part of our copending application Ser. No. 12,019, filed Feb. 14, 1979, now U.S. Pat. No. 4,254,885, issued Mar. 10, 1981.

This application pertains to the art of fluid reservoirs and more particularly to the art of plastic tanks. The invention has particular applicability to septic tanks and will be described with particular reference thereto. It will be appreciated, however, that the invention has broader applications such as subterranean storage of petroleum products, powdered chemicals, grains, and other fluid and nonfluid materials.

Subterranean tanks for septic use have heretofore been constructed primarily of concrete, although concrete block, fiberglass, and steel tanks have also been used. For petroleum and fluid storage, fiberglass and steel tanks are used primarily. These tanks are generally prefabricated but, in some instances, are fabricated on the installation site.

Septic tanks are commonly rectangular prisms of precast concrete or concrete blocks. Near the top on one of the vertical end walls is an inlet for raw sewage; near the top on the opposite end wall is an outlet which permits treated fluids to pass to the septic field. Generally, there is an access opening in the top for removing accummulated solid materials which have settled to the bottom of the tank. To install a precast tank, an excavation is made of suitable size and depth to place the outlet generally in the plane of a septic field. A mobile hoist is employed to lower the tank into the excavation.

One of the principal problems encountered when installing the prior art tanks in this manner is a difficulty in bringing the mobile hoist to the excavation site. Installation is limited to firm, generally level ground which is able to support the heavy equipment necessary to lift and lower the tanks.

Another problem with the prior art tanks has been flotation. In installations in which the level of ground water becomes high, the tanks tend to become buoyant. This buoyancy may cause the tanks to shift vertically or even pop out of the ground.

Prior attempts to produce plastic subterranean tanks have failed to achieve successful products. Plastic tanks tend to be more expensive than their concrete, fiberglass, or steel counterparts unless the tanks are made very lightweight. However, prior art lightweight tanks have failed to achieve the strength required to prevent them from collapsing under the subterranean soil and ground water loads.

The present invention contemplates a new and improved tank which overcomes the above-referenced problems and others. It provides a lightweight plastic tank which is cost and strength competitive with concrete, fiberglass, steel, and other prior art tanks.

SUMMARY OF THE INVENTION

In accordance with a first aspect of the present invention, there is provided a thin walled plastic tank for subterranean installations. The tank has a wall which has a peripheral edge disposed generally in a horizontal plane. A peripheral wall is connected to and extends generally upward from the peripheral edge to an apex area. The peripheral wall has a plurality of corrugations extending from the bottom wall to the apex area. An access means provides access to the interior of the tank.

In accord with a more limited aspect of the invention, the peripheral wall includes a plurality of rib portions disposed in root portions of the corrugation.

In accord with another more limited aspect of the invention, the peripheral wall is generally rounded in horizontal section and the apex area includes a generally horizontal top wall.

In accordance with yet another more limited aspect of the invention, the access means includes an annular sleeve extending from a root portion of one of the peripheral wall corrugations into the interior of the tank.

A principal advantage of the present invention is that it is lightweight and has great strength in both axial and radial directions.

Another advantage of the present invention is that it has a reduced tendency towards bouyancy and flotation.

Yet other advantages of the present invention lie in its reduced installation cost, watertight design, and easier handling.

Still further advantages will become apparent upon reading and understanding the following detailed description.

BRIEF DESCRIPTION OF THE DRAWINGS

The invention may take form in various parts and arrangements of such parts, preferred embodiments of which are illustrated in the accompanying drawings. The drawings which form a part of the detailed description are only for purposes of illustrating preferred embodiments of the present invention and are not to be construed as limiting the invention.

DESCRIPTION OF THE PREFERRED EMBODIMENTS

The figures show a corrugated plastic tank for underground installation. The tank is designed to hold fluid, semifluid, or other materials underground and is particularly adapted to holding sewage materials while they are being digested by anaerobic bacteria. The tank comprises a bottom wall A which terminates in an upward extending peripheral edge. The bottom wall is adapted to be disposed generally horizontally and receive the weight and forces of the internally held materials and the other parts of the tank. A peripheral wall B merges with the bottom wall A along its peripheral edge at a peripheral edge area and extends generally upward therefrom. Opposite the bottom wall A, the peripheral wall merges with an apex area C. The peripheral wall and apex area have cross-sectional shapes and several strengthening means to increase the strength of the tank relative to the various loading conditions to which it may be subject. An access means D allows access to the interior of the tank. In the preferred embodiment, the access means allows fluids to flow in and out of the interior of the tank and allows excess sedimentation to be removed.

FIGS. 1–5 illustrate an embodiment of the present invention in which the tank is elongated along a longitudinal axis. The bottom wall A terminates in a peripheral edge 10 which is disposed in a generally horizontal plane. The peripheral wall B is corrugated for greater strength. The corrugations extend upward, generally orthogonal, from the peripheral edge 10 toward the apex area C. The corrugations include alternating root portions 12 and crown portions 14. The root portions each comprise a pair of root walls 16 and 18 which converge toward the bottom of the root portion. In the preferred embodiment, the root walls converge at generally a 60 degree angle to each other and terminate in a narrow root base portion 20 at the bottom of the root portions. The base portion 20 is not necessary and the root walls may meet at the root base in a "V". The crown portions 14 are generally planar and extend between adjacent root portions.

Figure 1:
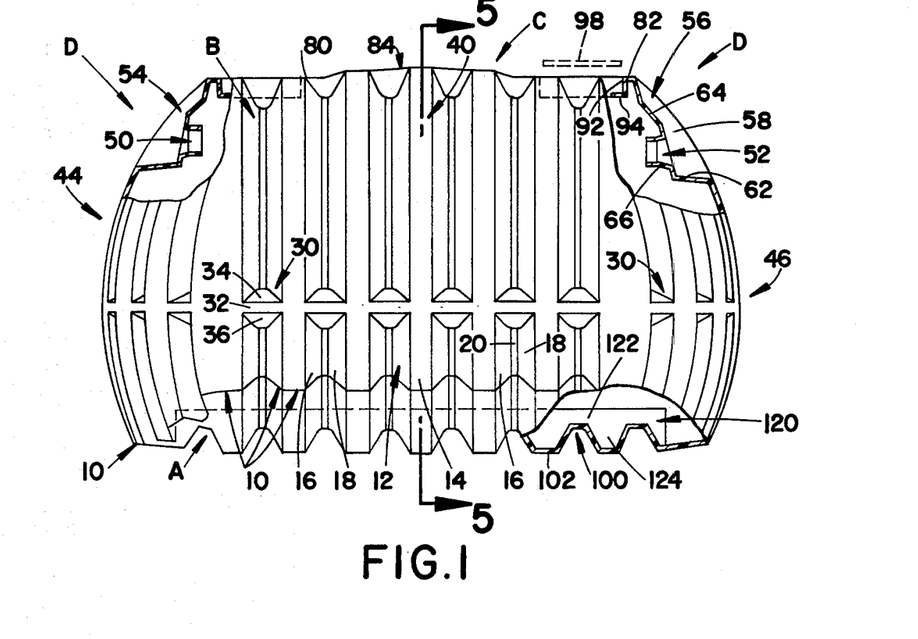
FIG. 1 is a side elevational view in partial section of a septic tank construction in accordance with the present invention.

With particular reference to FIG. 1, disposed in the root portions 12 of the peripheral wall B are a plurality of rib portions 30. Each rib portion has an outer portion 32 which is substantially flush with adjacent crown portions and a pair of rib side portions 34 and 36. The rib side portions extend from the outer portion 32 into the root portion 12 of the corrugation with which it is associated. The root side portions 34 and 36 slope relative to the outer portion 32 with substantially the same angle that the root walls 16 and 18 slope from their adjacent crown portions 14. One of the rib portions is disposed in each of the root portions in a common horizontal plane. Taken together, the rib portions form a peripheral or circumferential rib extending around the periphery of the tank. Preferably, the peripheral rib extends around the peripheral wall at its greatest cross-sectional extent. Alternately, the rib portions may be disposed in other patterns to strengthen the tank against peripheral compression. For example, an alternating pattern of one and two rib portions per root may be repeated around the periphery.

In the embodiment of FIGS. 1–5, the peripheral wall B is made up of a pair of oppositely disposed side walls 40 and 42 and first and second oppositely disposed end walls 44 and 46. The side walls 40 and 42 and the end walls 44 and 46 extend from the peripheral edge 10 to the apex area C. The side walls are elongated along the longitudinal axis giving the tank a horizontal cross section in which the side walls are generally linear and the end walls are arcuate. Alternately, the side walls may be arcuate such that the horizontal cross section of the tank is generally oval. As the transition between the end walls and the side walls of the peripheral wall B becomes smoother or more rounded, it becomes difficult to differentiate between them and identify a line of demarcation.

Figure 4:
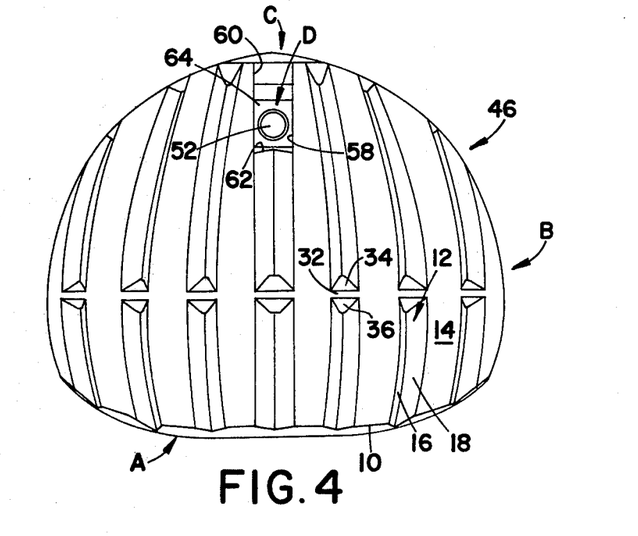
FIG. 4 is an end view of the tank illustrated in FIG. 1.

With particular reference to FIGS. 1 and 4, the access means D includes an inlet opening 50 and an outlet opening 52 which are oppositely disposed in the peripheral wall B. The inlet opening is located in an indentation area 54 and the outlet opening in an indentation area 56. The indentation areas recess the inlet and outlet openings below the outer surface of the tank to protect and strengthen the connection between the tank and the pipe or tubing for carrying raw or treated sewage. Except that the outlet opening 52 is a few inches lower than the inlet opening 50 to promote unidirectional fluid flow, the indentation areas 54 and 56 are substantially mirror images of each other. Accordingly, only indentation area 56 will be described in detail and it will be appreciated that the description applies to the inlet indentation area 54 by analogy. The indentation area 56 is recessed in a central root portion of the end wall 46. The indentation area has a pair of opposed indentation area side walls 58 and 60 spaced apart generally the width of the root portion, although it may be somewhat wider or narrower if desired. The indentation area is further defined by a sloping lower wall 62 and a generally vertical sloping back wall 64. The opening 52 is defined by a cylindrical sleeve 66 which projects inward from the back wall 64. The sleeve 66 is designed to achieve a watertight seal with external tubing or pipe connections. The seal may be improved by placing an O-ring between the pipe and the sleeve. Because the sleeve is recessed below the outer surface of the tank it is protected against damage during shipping, installation, and in a subterranean installation. Optionally, the indentation area side walls 58 and 60 may converge as they approach the back wall 64. If they converge to a spacing less than the diameter of opening 52, they may have arcuate depressions formed therein such that the pipe may extend between the indentation area side walls into the sleeve 66.

Figure 2:
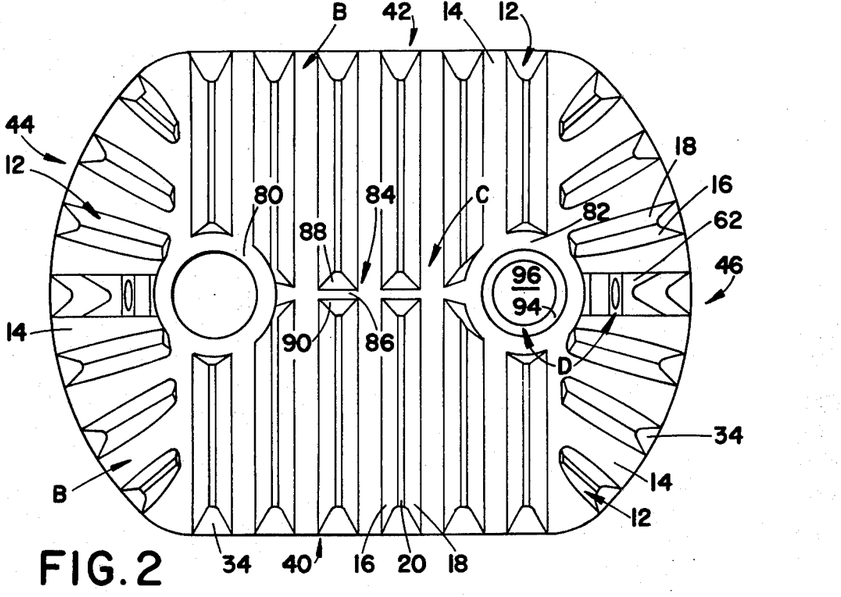
FIG. 2 is a top view of the tank illustrated in FIG. 1.

With particular reference to FIGS. 1 and 2, the apex area C includes a pair of rims 80 and 82 which are connected by a longitudinal, apex rib 84. The longitudinal, apex rib comprises a plurality of rib portions each of which has an outer surface 86 from which a pair of rib side portions 88 and 90 project into the root portions. The rib portions of the longitudinal, apex rib are substantially the same as the rib portions of the peripheral rib. The outer portions 86 are substantially flush with the crown portions 14 of the side wall corrugations which abut the apex area. With particular reference to FIG. 1, the apex rib 84 is arcuate in longitudinal cross section. The rim portions 80 and 82 merge with the outer portion 86 of the apex rib and the crown portions 14 of the peripheral wall corrugations. The back walls 64 of the indentation areas as well as some root portions 12 terminate adjacent the rim in downward depending wall portions. The rim 82 has a downward depending annular collar 92 leading to an inner annular wall portion 94. The annular wall portion 94 extends annularly around an access opening 96 which forms a part of the access means D. The opening 96 may be closed by placing a circular plate 98 on the annular flange 94. Alternately, a riser may be disposed on flange 94 to extend the opening upward to ground level. The rim 80 may have a similar structure to rim 82.

Figure 3:
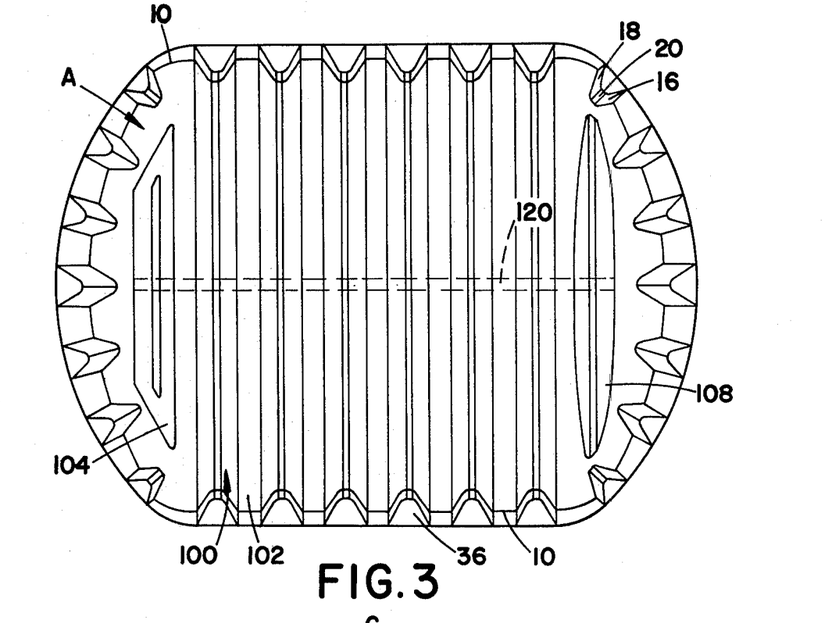
FIG. 3 is a bottom view of the tank illustrated in FIG. 1.
Figure 5:
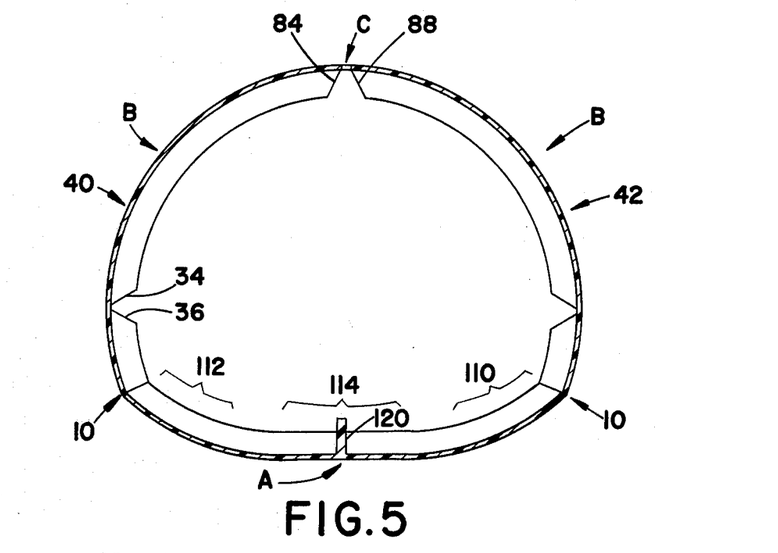
FIG. 5 is a section through section line 5—5 of the tank illustrated in FIG. 1.

With particular reference to FIG. 3, the bottom wall A has a plurality of corrugations extending transverse to the longitudinal axis. The bottom wall corrugations are formed by a plurality of alternating root portions 100 and crown portions 102. The root portions 100 have essentially the same cross section as the root portions 12 of the peripheral wall. The root and crown portions of the bottom wall merge with root and crown portions of the side walls 40 and 42 at the peripheral edge 10. A pair of partial corrugations 104 and 108 are disposed in end portions of the bottom wall in the area under the side walls 44 and 46. With particular reference to FIG. 5, the bottom wall A is substantially horizontal and generally flat when compared to the peripheral wall B. However, in transverse section, the bottom wall has a pair of oppositely disposed arcuate segments 110 and 112 connecting with the peripheral edge 10. A generally linear segment 114 connects the two arcuate segments. In the preferred embodiment, the peripheral wall B in transverse cross section is a generally circular arc segment and the arcuate segments 110 and 114 of the bottom wall are circular arc segments of the same radius.

With particular reference to FIGS. 1 and 5, the bottom wall A further includes means for inhibiting longitudinal compression of the bottom wall and means for inhibiting the bottom wall from arcing inward. A rib 120 disposed on the inner surface of the tank longitudinally along the bottom wall functions to prohibit both longitudinal compression of the bottom wall and an inward arcing of the bottom wall. The internal rib 120 includes a beam portion 122 which extends longitudinally along the interior surface of the root portions 100. A plurality of generally truncated triangular projections 124 project from the beam portion 122 along the interior surface of the crown portions 102. Alternately, the projections 124 may be further truncated such that they project only partially into the crown portions. In the preferred embodiment, the internal rib 120 is molded integrally with the bottom wall.

Figure 6:
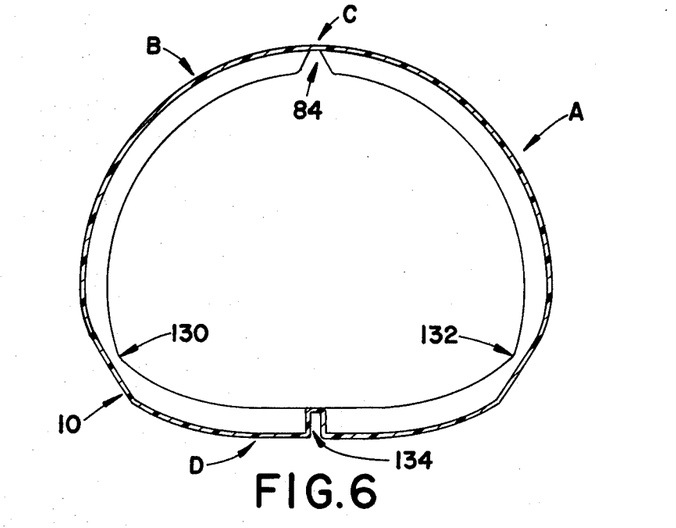
FIG. 6 is a similar section to the section of FIG. 5 of an alternate embodiment of the present invention.

FIG. 6 illustrates an alternate cross section through section line 5—5 of FIG. 2. In the embodiment of FIG. 6, the height of the crown portions relative to the root portions is decreased adjacent the peripheral edge of the bottom wall. These areas of reduced corrugation height 130 and 132 function as longitudinal reinforcing means. The bottom wall has an inwardly extending rib 134 which is generally rectangular in cross section. This rib helps provide longitudinal strengthening for the bottom wall and provides a cavity for receiving a beam or other means for inhibiting the bottom wall from arcing inward. Preferably, the beam is constructed of a non-decaying substance such as plastic. Alternately, the bottom wall may have no longitudinal rib, a rib analogous to rib 120 shown in FIGS. 3 and 5, or a longitudinal rib constructed of a plurality of rib portions of substantially the same construction as the peripheral rib portions 30.

Figure 7:
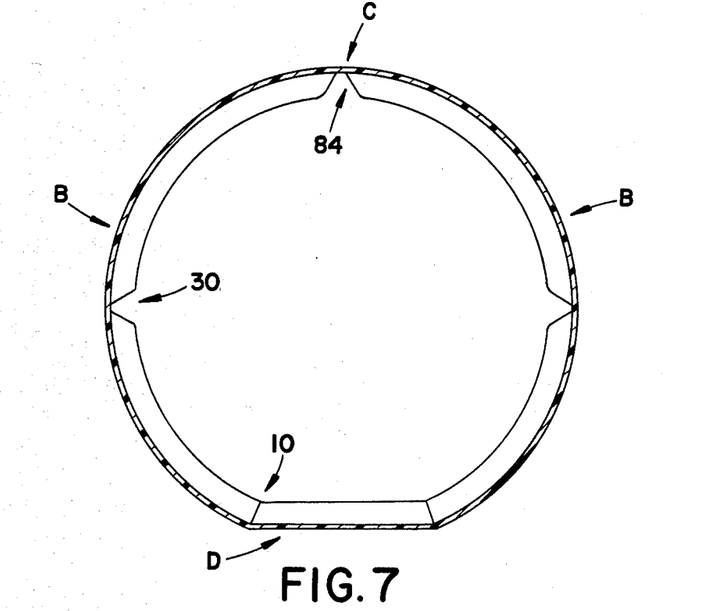
FIG. 7 is a sectional view of another alternate embodiment of the present invention.

FIG. 7 shows yet another alternate cross section through section line 5—5 of FIG. 2. The cross section of FIG. 7 is more circular than the cross section of FIG. 5 to increase its internal fluid capacity. For example, the embodiment of FIG. 5 may be dimensioned to hold 750 gallons and the embodiment of FIG. 7 may be dimensioned to hold 1000 gallons. In the embodiment of FIG. 7, the peripheral wall B has a transverse cross section which is substantially a circular arc segment. The bottom wall A is substantially flat in transverse section. Peripheral and apex ribs strengthen the tank relative to longitudinal and peripheral compressive forces.

Figure 8:
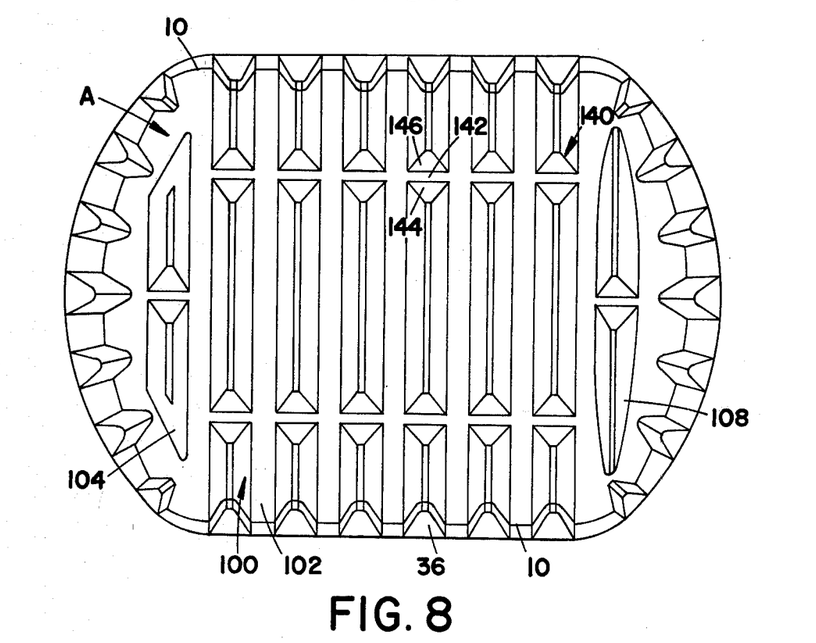
FIG. 8 is a bottom view of yet another alternate embodiment of the present invention.

FIG. 8 shows an alternate bottom wall longitudinal rib construction. The bottom wall A is formed with a plurality of rib portions 140. Each rib portion has an outer portion 142 that is flush with the crown portions 102 and side portions 144 and 146 which extend from outer portion 142 into root portions 100.

FIGS. 9–12 illustrate yet another alternate embodiment of the tank in accordance with the present invention. In this embodiment, elements are marked with the same reference numeral as like elements in FIGS. 1–5 followed by a prime ('). In this embodiment, the tank is generally spherical. The bottom wall A' terminates in a peripheral edge 10' which is disposed in a generally horizontal plane. The peripheral wall B' is corrugated with corrugations that extend from the peripheral edge 10' toward an apex area C'. The corrugations of the peripheral wall include alternating root portions 12' and crown portions 14'. The root portions each comprise a pair of root walls 16' and 18' which converge at a narrow root base portion 20' at the bottom of the root portions.

Figure 9:
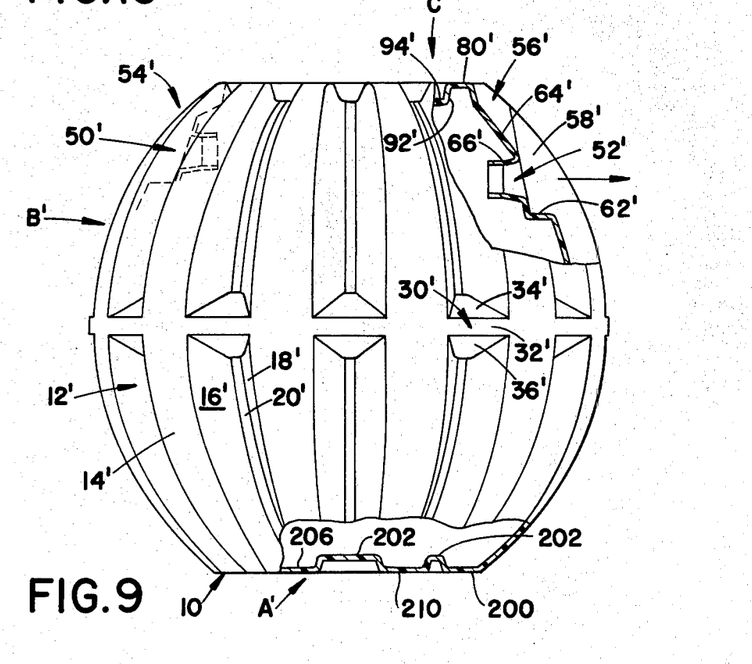
FIG. 9 is a side elevational view in partial section of another septic tank construction in accordance with the present invention.
Figure 12:
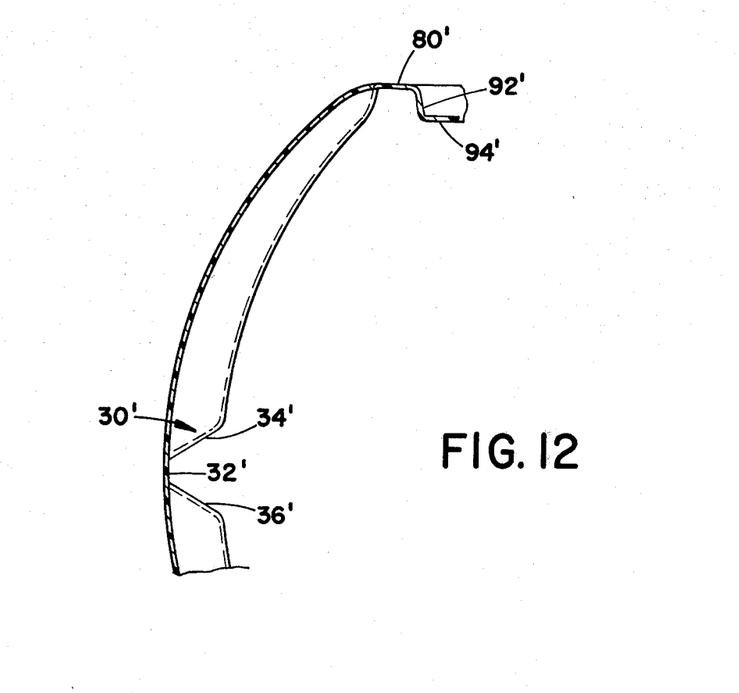
FIG. 12 is a sectional view through section line 12—12 of the tank illustrated in FIG. 10.

With particular reference to FIGS. 9 and 12, disposed in the root portions 12' of the peripheral wall B' are a plurality of rib portions 30'. Each rib portion has an outer portion 32' which is substantially flush with adjacent crown portions 14' and a pair of rib side portions 34' and 36'. The rib side portions extend from the outer portion 32' into the root portion 12' of the corrugations. The rib portions 30', taken together, form a peripheral or circumferential rib extending around the periphery of the tank. Alternately, the rib portions may be disposed in other patterns to provide radial, compressive strengthening of the tank.

Figure 10:
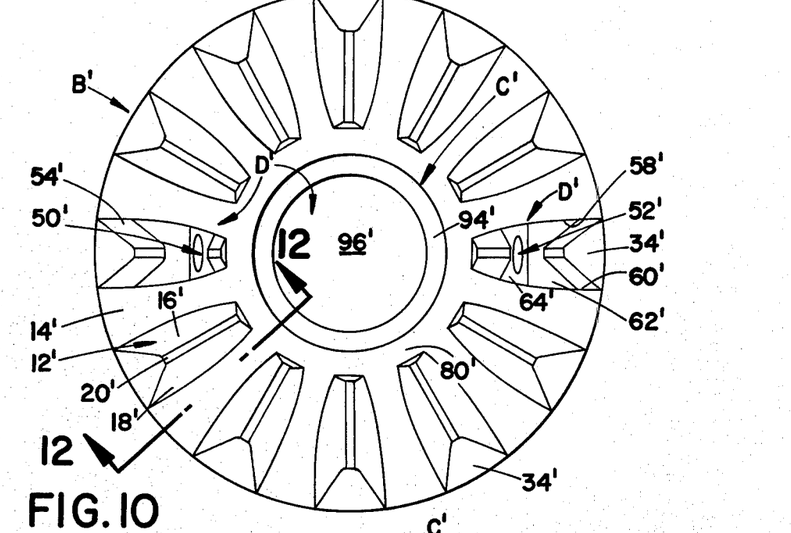
FIG. 10 is a top view of the tank illustrated in FIG. 9.
Figure 11:
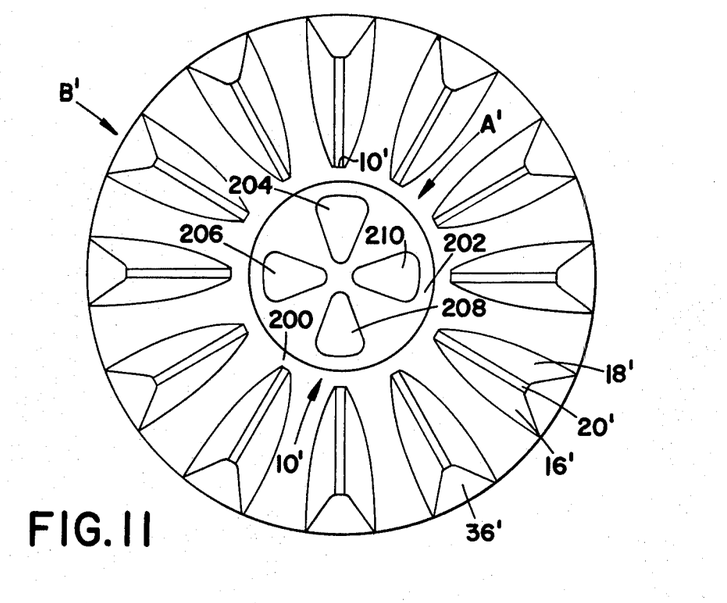
FIG. 11 is a bottom view of the tank illustrated in FIG. 9.

With particular reference to FIGS. 10 and 11, the peripheral wall if substantially circular in horizontal cross section. Alternately, the horizontal cross section may be more oval and elongated. Further, the cross section may include linear and arcuate segments. Oval, eliptical, and other generally rounded horizontal cross sections are contemplated by the present invention. The peripheral wall B' is also arcuate in vertical cross section. Preferably, the radius of curvature of the peripheral wall B' in vertical cross section is slightly greater than its radius of curvature in the horizontal cross section.

With particular reference to FIGS. 9 and 10, the access means D' includes an inlet opening 50' and an outlet opening 52' which are oppositely disposed in the peripheral wall B'. The inlet and outlet openings are disposed in an inlet indentation area 54' and an outlet indentation area 56', respectively, which are generally mirror images of each other. Indentation area 56' will be described in detail and it will be appreciated that the description applies by analogy to indentation area 54'. The indentation area has a pair of oppositely disposed indentation area side walls 58' and 60' which are spaced apart generally the width of a root portion, a sloping, generally horizontal bottom wall 62', and a sloping, generally vertical back wall 64'. The opening 52' is defined by a cylindrical sleeve 66' which projects inward from the back wall 64'.

With continued reference to FIGS. 9 and 10, the apex area C' is a generally flat and horizontal top wall area. The top wall area includes a rim 80' which has a downward depending annular collar 92' leading to an inner annular wall portion 94'. The annular wall portion 94' defines an access opening 96' which forms a part of the access means D' for allowing access to the interior of the tank.

With particular reference to FIGS. 9 and 11, the bottom wall A' is generally flat and horizontal. The bottom wall includes a rim 200 which surrounds a recessed area 202. A plurality of projections 204, 206, 208, and 210 project upward from the recessed area 202 to a height commensurate with rim 200. This arrangement of recessed areas, rims, and projections provides a means for reinforcing the bottom wall against inward deflection under subterranean loading conditions.

The invention has been described with reference to the preferred embodiments. Obviously modifications and alterations will occur to others upon the reading and understanding of the specifications. It is my intention to include all such modifications and alterations insofar as they come within the scope of the appended claims or the equivalents thereof.

We claim:

1. A thin walled plastic tank for subterranean storage and transmission of materials, said tank comprising:
 a bottom wall having a peripheral edge disposed generally in a horizontally plane;
 a peripheral wall connected to and extending generally upward from the peripheral edge to an apex area, the peripheral wall having a plurality of corrugations extending from the bottom wall toward the apex area, the corrugations comprising alternating crown and root portions, a plurality of rib portions disposed in the root portions of the corrugations, each rib portion having an outer portion which is substantially flush with the crown portions and side portions which extend from the outer portion into one of the root portions; and
 access means for allowing access to the interior of the tank.

2. The tank as set forth in claim 1 wherein at least one of the plurality of rib portions is disposed in each of the root portions.

3. The tank as set forth in claim 2 wherein the plurality of rib portions are disposed in a common plane circumscribing the tank.

4. The tank as set forth in claim 2 wherein the peripheral wall is arcuate in vertical cross section.

5. The tank as set forth in claim 4 wherein the vertical cross section is at least partially a substantial circular arc.

6. The tank as set forth in claim 1 further including a first indentation area located in a first root portion and a second indentation area located in a second root portion, said access means including a fluid inlet opening in the first indentation area and a fluid outlet opening in the second indentation area.

7. The tank as set forth in claim 1 wherein the peripheral wall is rounded in horizontal cross section.

8. The tank as set forth in claim 7 wherein the peripheral wall is substantially circular in horizontal cross section.

9. The tank as set forth in claim 7 wherein the apex area includes a generally horizontal top wall.

10. The tank as set forth in claim 7 wherein the apex area includes an annular rim, an annular collar depending inward from the annular rim, and an annular wall portion connected with the annular collar, and wherein the access means includes an aperture defined by the annular wall portion.

11. The tank as set forth in claim 7 wherein the apex area includes an annular rim which is peripherally connected with the peripheral wall and wherein the access means includes a reclosable opening inside the annular rim.

12. The tank as set forth in claim 7 wherein the bottom wall includes a recessed area and a plurality of projections from the recessed area.

13. The tank as set forth in claim 1 wherein the tank is elongated in a longitudinal direction and wherein the bottom wall includes means for inhibiting inward arcing movement.

14. The tank as set forth in claim 13 wherein the tank is elongated in a longitudinal direction and wherein the inward arcing inhibiting means includes a longitudinally extending rib.

15. A thin walled plastic tank for subterranean storage and transmission of materials, said tank comprising:
 a generally horizontal bottom wall having a round peripheral edge disposed generally in a horizontal plane,
 a peripheral wall connected to and extending generally upward from the peripheral edge to an apex area, the peripheral wall having a plurality of corrugations including alterating crown and root portions which extend from the bottom wall toward the apex area, the peripheral wall having a generally rounded horizontal cross section;
 the apex area including a generally horizontal top wall area; and
 an enlargement of one of the root portions defining a recessed indentation area integral with the peripheral wall, a sleeve integral with the indentation area to define an access opening, such that the sleeve is disposed below the outer surface of the tank for protection against damage.

16. The tank as set forth in claim 15 wherein the peripheral wall is arcuate in vertical cross section.

17. The tank as set forth in claim 16 wherein the rounded horizontal cross section is substantially circular and wherein the arcuate vertical cross section is substantially a circular arc segment.

18. The tank as set forth in claim 16 wherein the top wall area includes an annular rim connected around its periphery with the peripheral wall.

19. The tank as set forth in claim 18 further including an aperture disposed in the top wall area inside the annular rim.

20. A thin walled plastic tank for subterranean storage and transmission of materials, said tank comprising:
 a generally horizontal bottom wall having a round peripheral edge disposed generally in a horizontal plane,
 a peripheral wall connected to and extending generally upward from the peripheral edge to an apex area, the peripheral wall including a plurality of corrugations including alternating crown and root portions which extend from the bottom wall toward the apex area, the peripheral wall having a generally rounded horizontal cross section, the peripheral wall including a peripheral rib extending around the periphery of the tank, the peripheral rib including a plurality of rib portions disposed in the root portions, each rib portion having an outer portion which is substantially flush with the crown portions and having side portions which extend from the outer portion into the adjacent root portion;
 the apex area including a top wall area; and
 access means for allowing access to the interior of the tank.

21. The tank as set forth in claim 20 wherein the access means includes an indentation area located in one of the root portions and a fluid access opening disposed in the indentation area.

22. The tank as set forth in claim 21 wherein the fluid access opening is defined by an annular sleeve extending from the indentation area into the interior of the tank.

23. The tank as set forth in claim 15 wherein the peripheral wall includes a peripheral rib extending around the periphery of the tank.

24. The tank as set forth in claim 15 wherein the tank has a capacity of between 200 and 400 gallons.

25. A thin wall plastic tank for subterranean storage and transmission of fluids, said tank comprising:

- a bottom wall having a peripheral edge disposed generally in a horizontal plane;
- a peripheral wall connected to and extending generally upward from the peripheral edge to an apex area, the peripheral wall having a plurality of corrugations extending from the bottom wall toward the apex area, the corrugations comprising alternating crown and root portions; and,
- an enlargement of one of the root portions defining a recessed indentation area integral with the peripheral wall, a sleeve integral with the indentation area to define an access opening, such that the sleeve is disposed below the outer surface of the tank for protection against damage.

* * * * *

UNITED STATES PATENT AND TRADEMARK OFFICE
CERTIFICATE OF CORRECTION

PATENT NO. : 4,359,167
DATED : November 16, 1982
INVENTOR(S) : Fouss et al.

It is certified that error appears in the above—identified patent and that said Letters Patent is hereby corrected as shown below:

In column 6, line 34, please delete "if" and insert -- is --.

Signed and Sealed this

Eighth Day of February 1983

[SEAL]

Attest:

GERALD J. MOSSINGHOFF

Attesting Officer

Commissioner of Patents and Trademarks